United States Patent [19]

Ness

[11] Patent Number: 5,653,248
[45] Date of Patent: Aug. 5, 1997

[54] PROTECTIVE COVER FOR A CHILDREN'S BICYCLE SEAT

[76] Inventor: Donna Ness, 6233 SE. 158th Ct., Ocklawaha, Fla. 32179

[21] Appl. No.: 544,037

[22] Filed: Oct. 17, 1995

[51] Int. Cl.⁶ .................................................. E04H 15/02
[52] U.S. Cl. .................................................. 135/96; 135/151
[58] Field of Search .......................... 135/96, 128, 143, 135/151, 158, 90, 152

[56] References Cited

U.S. PATENT DOCUMENTS

| | | | |
|---|---|---|---|
| 2,811,977 | 11/1957 | McClish | 135/96 X |
| 3,052,251 | 9/1962 | De Jean | 135/96 |
| 3,131,704 | 5/1964 | Shimon | 135/96 X |
| 3,333,888 | 8/1967 | Williams et al. | 135/96 X |
| 3,768,860 | 10/1973 | Barker | 135/96 X |
| 4,083,601 | 4/1978 | McBeth | 135/96 X |
| 4,170,242 | 10/1979 | Caso | 135/96 X |
| 5,380,059 | 1/1995 | Felling | 135/96 X |

FOREIGN PATENT DOCUMENTS

| | | | |
|---|---|---|---|
| 426002 | 6/1911 | France | 135/96 |

*Primary Examiner*—Lanna Mai
*Attorney, Agent, or Firm*—Dorothy S. Morse

[57] ABSTRACT

A sun shade for the type of bicycle seat used to carry small children on an adult bicycle in which overhead material protects the child from solar radiation and a strong support frame protects the child during bicycle accidents. The top of the sun shade invention is hinged to allow easy access to the child. Also, the sun shade may include transparent side curtains which further protect the child during bicycle accidents, protect the child during inclement weather, and allow the child to look sideways to view its surroundings.

6 Claims, 2 Drawing Sheets

PROTECTIVE COVER FOR A CHILDREN'S BICYCLE SEAT

BACKGROUND

1. Field of Invention

This invention relates to protective covers, specifically to a sun shade for the type of bicycle seat used to carry small children on an adult bicycle in which overhead material protects the child from solar radiation and a strong support frame protects the child during bicycle accidents.

2. Description of Prior Art

It is generally agreed that children's exposure to solar radiation, particularly to ultraviolet (UV) radiation, should be limited. Devices used to shield children from UV radiation while riding in an automobile include segments of UV protecting material connected to suction cups for attachment to automobile windows, UV protecting material in the form of a film to press directly on an automobile window, and UV protecting material in the form of a rolled shade that may be clipped to the top of an automobile window and selectively lowered into different positions. None of these devices is readily acceptable for use on a children's bicycle seat.

Many of today's parents enjoy outdoor activities and take their children with them while walking, jogging, hiking, and cycling. They may use traditional strollers for walking, big-wheel strollers for jogging, all-terrain strollers for hiking, and the types of children's bicycle seat used to carry a child on an adult bicycle for cycling. Almost all of the different types of stroller provide some sort of canopy to protect the child from sun, wind and rain. Most of the canopies are designed for use with a specific model of stroller and are not readily adaptable for use on a children's bicycle seat. It is not known to have a cover for a children's bicycle seat to protect the child from UV radiation and also which is strong enough to protect the child during bicycle accidents.

SUMMARY OF THE INVENTION

Objects and Advantages

It is the primary object of this invention to provide a cover for a children's bicycle seat that would protect a child sitting therein from excess solar radiation, especially UV radiation. It is also an object of this invention to provide a cover for a children's bicycle seat with a strong support frame that would protect a child sitting therein during bicycle accidents. A further object of this invention is to provide a cover for a children's bicycle seat that would allow easy entry and removal of the child therefrom. It is also an object of this invention to provide a cover for a children's bicycle seat that has a support frame that, while strong, does not become excessively hot to the touch. A further object of this invention is to provide a cover for a children's bicycle seat that is lower in the front and higher in the back to allow better air flow over th cover during use. It is also an object of this invention to provide a strong frame that is lightweight in composition so that an excessive amount of weight is not added to the supporting bicycle.

As described herein, properly manufactured and installed on a children's bicycle seat, the present invention would provide a sun shade for a child seated therein and would also provide protection for the child seated therein during bicycle accidents. A hinged top would provide easy access to the child for entry and removal from the children's bicycle seat. The top and rearward portions of the present invention would be made of a material which protects the child from UV radiation. Transparent side curtains would also protect the child during bicycle accidents, protect the child during inclement weather, and allow the child to look sideways to view its surroundings.

The description herein provides preferred embodiments of the present invention but should not be construed as limiting the scope of the sun shade invention. Variations in shape of the sun shade structure, attachment of the sun shade invention to the children's bicycle seat, hinging of the top of the sun shade invention to allow access to the child, materials from which the sun shade is constructed, fasteners used to hold the sun shade invention together, means for creating a low surface temperature on the sun shade support structure, and other than those described herein, can be incorporated into the present invention. Thus the scope of the present invention should be determined by the appended claims and their legal equivalents, rather than the examples given.

DETAILED DESCRIPTION OF PREFERRED EMBODIMENTS

Figure 1:
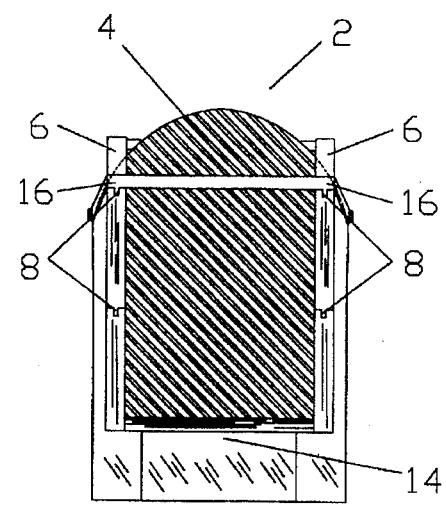
FIG. 1 is a top view of the present invention.

FIG. 1 shows the preferred embodiment of a protective covering invention 2 having darkened sun shade material 4 supported by a framework composed of a U-shaped top support bar 14, a pair of side frame members 16, and a pair of rear support bars 6. It is contemplated for other embodiments of the present invention to have varying numbers of top support bars 14, side frame members 16, and rear support bars 6, including a second pair of side frame members 16 attached between top support bar 14 and forward bottom portions of children's bicycle seat 10.

In the preferred embodiment shown in FIG. 1, top support bar is U-shaped, having two elongated arms and a crossbar connected therebetween, the crossbar being positioned toward the front portion of the children's bicycle seat. Also, in FIG. 1, side frame members 16 and rear support bars 6 are respectively attached to side portions and rearward bottom portions of children's bicycle seat 10. It is contemplated for such attachment to be by and conventional means which will securely attach the present invention to a children's bicycle seat. Sun shade material 4 attaches to and covers the area between rear support bars 6 and top support bar 14 to provide overhead and rearward protection from UV radiation for a child (not shown) sitting in children's bicycle seat 10. Hinges 8 allow top support bar 14 to be folded so that a child (not shown) seated in children's bicycle seat 10 may easily enter and be removed therefrom. The hinges are shown in FIG. 1 to be connected at the mid-section and rearward end of each of each elongated arm. Thereby a forward portion of top support bar 14, defined between said mid-sections and said crossbar, and a rearward portion of top support bar 14, defined between said mid-section of each of said arms and the rearward end of each elongated arm, can pivot upwardly and rearwardly so as to allow said forward portion to pivot at the mid-sections rearwardly over the rearward portion, and allow the rearward portion to also pivot upwardly and rearwardly into an out-of-the-way position for easy entry and removal of children from the bicycle seat. In the preferred embodiment top support bar 14, side frame members 16 and rear support bars 6 would be made of a strong material, such a strong metal or metallic compound to protect a child seated in children's bicycle seat 10 during bicycle accidents. While strength is required, the material for top support bar 14, side frame members 16 and rear support bars 6 should also be lightweight so as not to add an excessive amount of weight to a supporting bicycle (not shown). It is also contemplated in the present invention for top support bar 14, side frame members 16 and rear support bars 6 to have means for creating a low surface temperature positioned thereon so that a child's hands or fingers will not become injured from touching a hot surface. In the preferred embodiment rubber or foam would be used to lower such surface temperatures.

Figure 2:
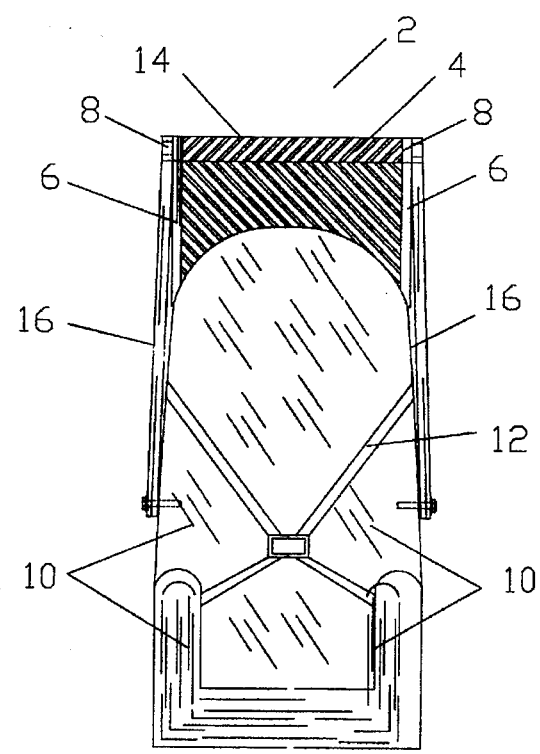
FIG. 2 is a front view of the present invention attached to a children's bicycle seat.
Figure 3:
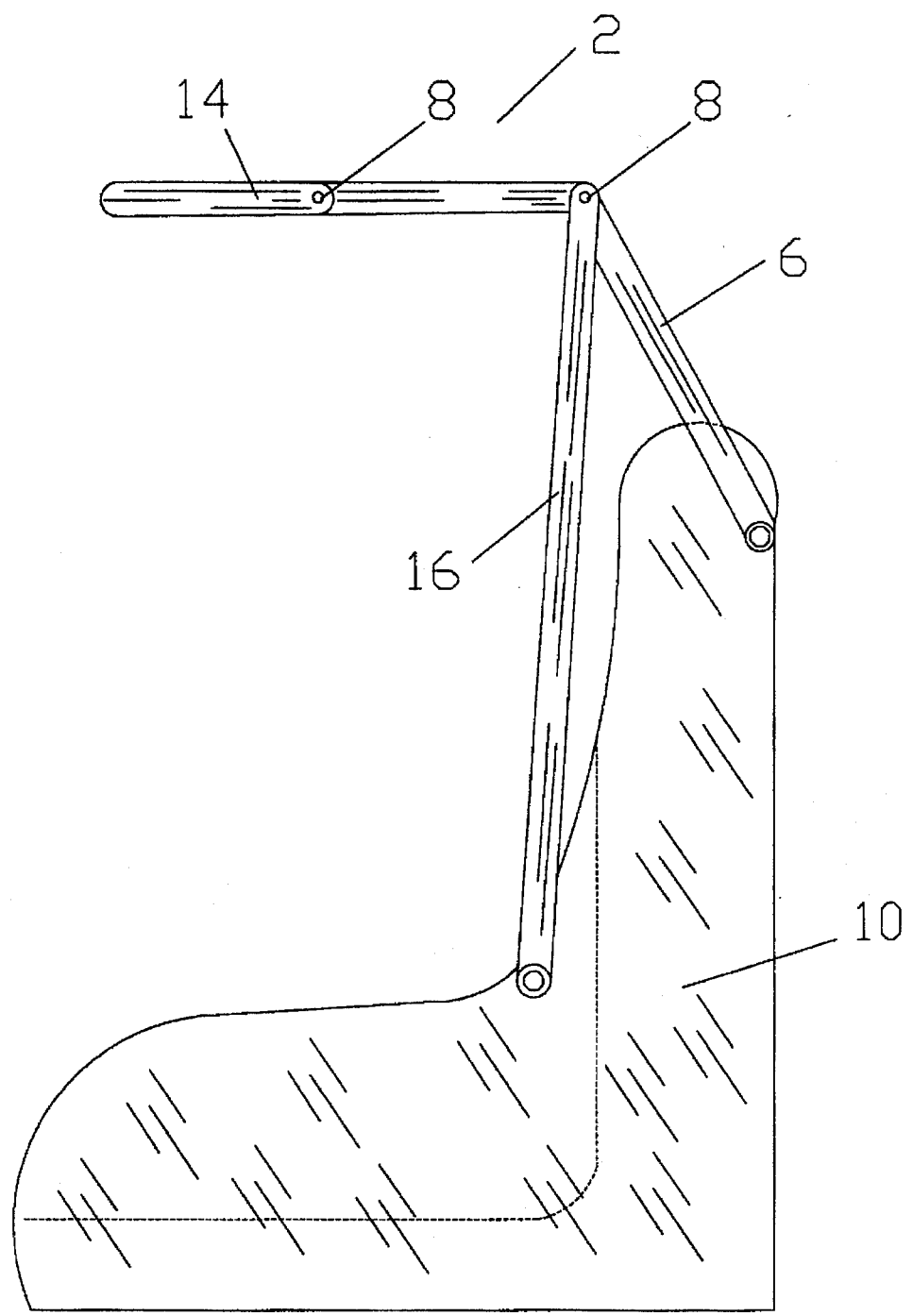
FIG. 3 is a left side view of the present invention attached to a children's bicycle seat.

FIG. 2 shows protective covering invention 2 attached to children's bicycle seat 10. A seat belt and buckle 12 are provided on children's bicycle seat 10 to firmly position a child (not shown) therein. FIG. 3 more clearly shows the attachment of side frame members 16 to children's bicycle seat 10. It is contemplated for clear side curtains (not shown) to be attached to side frame members 16 to provide additional protection for a child during bicycle accidents and inclement weather, while at the same time allowing the child to look sideways to view its surroundings. Although FIG. 3 shows top support bar 14 in a horizontal position, it is also contemplated for top support bar 14 to be slightly lower than rear support 6 to allow better air flow over protective covering invention 2 during use.

What is claimed is:

1. A protective cover for attachment to the type of bicycle seat used to carry a small child on an adult bicycle, said protective cover comprising a U-shaped top support bar having two elongated arms and a crossbar connected therebetween, each of said arms having a rearwardly positioned end, each of said arms also having a mid-section, said top support bar having a forward portion defined between said mid-sections and said crossbar and a rearward portion defined between said mid-section of each of said arms and said rearwardly positioned end; a plurality of rear support bars each having opposite ends, a plurality of side frame members each having opposed ends and a central portion; said top support bar, said rear support bars and said side frame members each being made from rigid materials sufficiently strong so as to protect a child positioned therebetween from injury and not collapse around said child during bicycle accidents; one of said opposed ends of each of said side frame members connected to the type of bicycle seat used to carry a small child on an adult bicycle, hereinafter referred to as a child's bicycle seat, and said central portions of at least one of side frame members also being connected to said rearwardly positioned ends of said arms; one of said opposite ends of each of said rear support bars being connected to said child's bicycle seat, and the other of said opposite ends being connected to said central portion of one of said side frame members so that said top support bar, said rear support bars and said side frame members are assembled together into a support frame having an overhead portion and a rearward portion; connecting means for attaching said ends of said side frame members and said ends of said rear support bars to said child's bicycle seat; said protective cover also comprising a quantity of material sufficient in dimension to substantially cover said support frame and provide protection of a small child positioned thereunder from ultraviolet radiation, said quantity of material attached to said overhead and said rearward portions of said support frame so that a child seated in said child's bicycle seat is protected from bicycle accidents, as well as overhead and rearwardly directed ultraviolet radiation; and said protective cover comprising a plurality of hinges, one of said hinges being attached to each of said mid-sections to allow said forward portion to pivot at said mid-sections upwardly and rearwardly relative to said rearward portion of said top support bar, one of said hinges being attached to the other opposite end of each of said arms so as to allow said rearward portion of said top support bar to pivot upwardly and rearwardly relative to said side frame members to allow easy entry and removal of a child from said child's bicycle seat.

2. The protective cover of claim 1 wherein said top support bar, said rear support bars and said side frame members are made from lightweight materials.

3. The protective cover of claim 1 further comprising a second quantity of material to provide lateral protection for a child positioned adjacent thereto during bicycle accidents and inclement weather, said second quantity of material being attached to said side frame members and said top support bar.

4. The protective cover of claim 3 wherein said second quantity of material is transparent to allow said child to view lateral surroundings beyond said protective cover.

5. The protective cover of claim 1 wherein said support frame has a lower front portion and a slightly higher rear portion to allow better flow of air over said protective cover during use.

6. The protective cover of claim 1 further comprising means to cover said support frame so that said support frame will not become hot enough to injure said child.

\* \* \* \* \*